May 24, 1932.   W. E. WINN   1,859,420
WELL SURVEYING DEVICE
Filed April 2, 1929
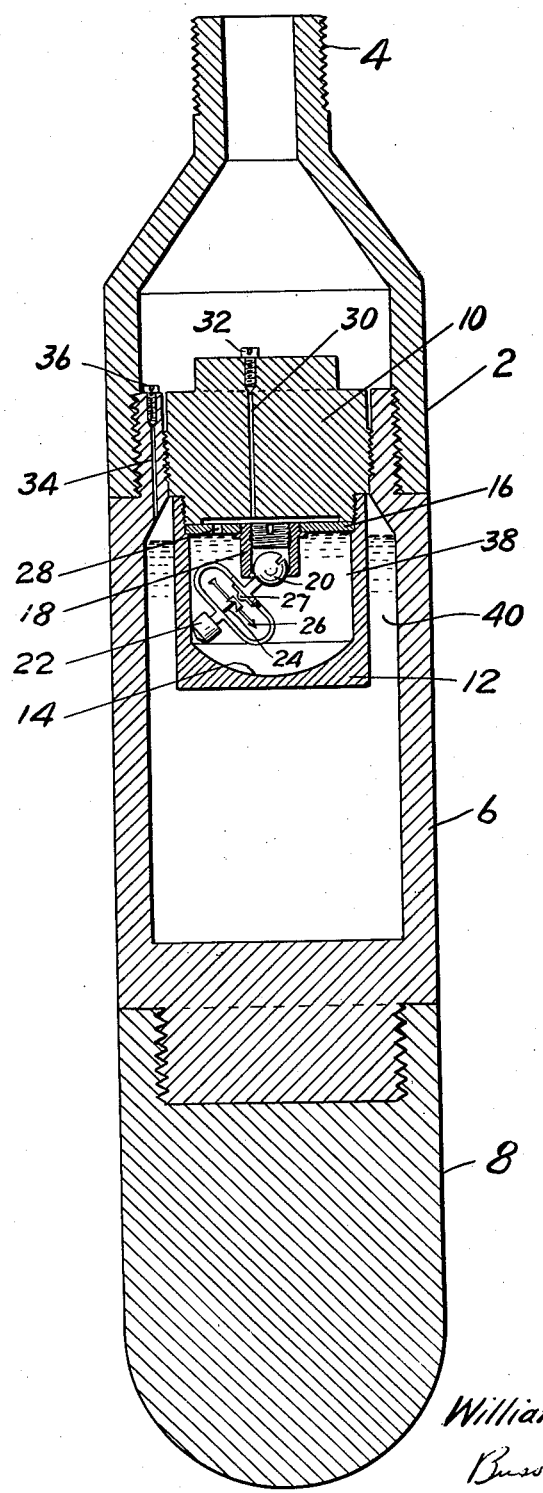
WITNESS:
INVENTOR
William E. Winn
BY
ATTORNEYS.

Patented May 24, 1932

1,859,420

UNITED STATES PATENT OFFICE

WILLIAM E. WINN, OF DALLAS, TEXAS, ASSIGNOR, BY MESNE ASSIGNMENTS, TO SPERRY-SUN WELL SURVEYING COMPANY, OF PHILADELPHIA, PENNSYLVANIA, A CORPORATION OF DELAWARE

WELL SURVEYING DEVICE

Application filed April 2, 1929. Serial No. 351,852.

This invention relates to a well surveying device of the type adapted to be lowered into a bore hole and arranged to give a suitable record of the orientation of the hole at a given point.

In drilling oil wells or the like, it may happen, due to variations in the strata through which the drill passes, or to other causes, that the bore hole will deviate to a considerable extent from the vertical and assume very decided angles relative to the vertical direction. As a result of this deviation, serious errors may enter into the geological interpretations and recommendations concerning subsurface structure, water shut-offs, valuations of property, etc., etc. In view of the resultant desirability of determining the location of any or all parts of a bore hole, various devices have heretofore been devised for determining with more or less accuracy the path of the bore hole through the soil.

One form of well surveying device which has been proposed includes a brass casing which may be lowered into the bore hole and which contains a compass carried by a float in an aqueous solution of gelatin which is initially heated. The device is then lowered into a bore hole and permitted to remain there for a sufficient time for the gelatin solution to solidify. Upon withdrawal of the device, the compass needle and float will bear a position relative to the casing which will indicate the azimuth of the angle of deviation of the bore hole from the vertical.

It is found that an aqueous gelatin solution will not set at a temperature above 80° F. to 90° F. Such solution is accordingly useless in a great many oil wells where the lowest temperature is found to be from 70°–80° F. and temperatures at the lower portions thereof range as high as 150° F. or more.

One object of the present invention is to provide a well surveying device which is adapted for use at the relatively high temperatures found in oil wells.

A further object of the device relates to means whereby a bath of fusible or liquefiable material may be maintained in the liquid condition during the period of descent of the well surveying device within the bore hole.

A further object of the invention relates to the provision of an improved means which is movable relatively to the casing of the well surveying device to indicate the angle and direction of slope of the device at a given point in the bore hole.

Other more specific objects of the invention will be apparent from the following description taken in conjunction with the accompanying drawing in which the figure illustrates an axial section through the improved device.

The well surveying device consists of a casing which includes three main parts, namely, a head 2 which is provided at its upper end with suitable threads 4 for connection to a cable or the like, a central hollow receptacle 6 which is threaded into the head 2 so as to be closed thereby, and a weighted lower end portion 8 suitably secured to portion 6. Except for the compass needle hereinafter described, all of the parts are of brass or some other non-magnetic material so that the deviations of the compass needle will not be affected by the contiguous parts of the device.

Threaded within the upper end of the hollow portion 6 is a bushing 10 provided with a suitable square or hexagonal head whereby it may be turned, which bushing is threaded at its lower portion to carry a receptacle 12 having an internal spherically shaped bottom 14. A disc 16 is held in fixed relation by the engagement of its periphery between an annular ledge in the interior of receptacle 12 and bushing 10. This disc 16 carries a member 18 which, as illustrated in the figure, forms a socket receiving a ball 20. A screw plug closes the outer end of the opening in member 18 to afford means whereby ball 20 may be removed therefrom for cleaning.

A pendulum 22 is secured to ball 20 and is provided with a suitable weighted bob and an open central space, as disclosed, in which is located a pin 24 supporting a compass needle 26, the said compass needle being maintained upon the pin by means of a lug 27 which may be removed to facilitate cleaning or adjustment of the needle.

Disc 16 is provided with an opening 28 furnishing communication between the interior of receptacle 12 and an opening in the bottom of bushing 10 from which extends a small bore 30 adapted to be closed at its open end by a tapered screw 32 which, in effect, acts as a needle valve.

A suitable bore 34 joins the interior of portion 6 of the casing with the interior of head 2 and is normally closed by a screw 36 similar to 32.

The interior of receptacle 12 contains a bath 38 of a material which has a melting point higher than the temperature normally reached in bore holes for oil wells. A suitable material for this bath consists of carnauba wax which has a melting point of 172° F. and which remains mobile until within a few degrees of its actual solidification temperature and contracts slightly upon cooling, thereby allowing it to be slipped out of any container in which it solidifies. It will be obvious that, irrespective of the temperature of the bore hole unless highly abnormal, this material will solidify after a suitable lapse of time and when it does solidify will maintain the pendulum 22 and compass carried thereby in a position relative to the casing which the pendulum and compass have assumed when the casing is in the desired position in the bore hole. By reason of the contraction of the wax, the disc 16, the solidified wax and the pendulum and compass needle enclosed therein, may be readily removed from receptacle 12. They may then, as a unit, be subjected to an X-ray in order to determine the positions of the members, or the wax may be removed by chipping the same away from the pendulum and compass needle in order to make this determination. By reason of the fact that the wax remains mobile until within a few degrees of its solidification temperature, the needle and pendulum will be free to swing until the time when solidification takes place, thus insuring a true reading.

If it is desired to use the device in bore holes which do not have the high temperature necessitating the use of carnauba wax alone and in order to eliminate the necessity of heating the receptacle to a high temperature, other materials or carnauba wax mixed with other materials, such as paraffine wax, may be substituted in order to lower the normal melting point. On the other hand, in like manner, other materials with higher solidification points, may be used in wells in which the temperature is exceptionally high.

In order to maintain the wax above its melting point during the lowering of the device into the bore hole, it may be desirable to provide a suitable material 40 about the receptacle and within the hollow portion of section 6 of the casing, which material may or may not be heated prior to the assembly of the parts of the device. As regards the method of heating, the device may be completely assembled except for the placing in position of head 2 and heated as a unit, the bores 30 and 34 being opened by the removal of screws 32 and 36 so that the material which expands during the heating may flow outwardly. These bores may then be plugged by the screws in order to prevent spilling of the contents. The material 40 may consist either of oil or other liquid or a powdered or pulverized solid having a suitable low thermal conductivity for maintaining the temperature of the receptacle.

The universally supported pendulum disclosed is found advantageous in securing a free movement of the pendulum and needle with consequent accuracy of the readings. Furthermore, by combining the pendulum and needle in the manner shown, the equipment is made much more simple than in previously devised instruments used for similar purposes.

What I claim and desire to protect by Letters Patent is:

A well surveying device comprising a casing adapted to enter a bore hole, means adapted to assume a fixed relationship relative to reference directions including a pendulum, a ball and socket joint supporting the pendulum for universal pivotal movement in the casing a compass needle pivotally carried by the pendulum between its support and its lower end, and a fusible medium, said pendulum and compass needle being submerged in said medium.

In testimony of which invention, I have hereunto set my hand at Dallas, Texas, on this 25th day of March, 1929.

WILLIAM E. WINN.